United States Patent
Kang et al.

(10) Patent No.: US 8,903,313 B2
(45) Date of Patent: Dec. 2, 2014

(54) ADAPTIVE SLICER FOR A DISCRETE LEVEL AMPLITUDE MODULATION RECEIVER

(71) Applicant: QUALCOMM Incorporated, San Diego, CA (US)

(72) Inventors: Eunmo Kang, San Diego, CA (US); James Y. Hurt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 13/791,705

(22) Filed: Mar. 8, 2013

(65) Prior Publication Data

US 2014/0080412 A1    Mar. 20, 2014

Related U.S. Application Data

(60) Provisional application No. 61/702,978, filed on Sep. 19, 2012.

(51) Int. Cl.
*H04B 5/00* (2006.01)
*H04L 25/06* (2006.01)

(52) U.S. Cl.
CPC ............... *H04B 5/00* (2013.01); *H04L 25/066* (2013.01); *H04B 5/0062* (2013.01); *H04B 5/0075* (2013.01)
USPC ..................................... 455/41.1; 455/41.2

(58) Field of Classification Search
CPC ............. H04B 5/0043; H04B 5/0081; H04B 17/0072; H04B 5/00; H04B 5/0062; H04B 5/0075; H04L 25/066
USPC ................... 455/41.1, 41.2, 41.3, 556.1
See application file for complete search history.

(56) References Cited

U.S. PATENT DOCUMENTS

| | | | |
|---|---|---|---|
| 4,641,324 A | 2/1987 | Karsh et al. | |
| 7,636,794 B2 * | 12/2009 | Ramos et al. | 709/248 |
| 7,917,088 B2 | 3/2011 | Hyde et al. | |
| 7,986,916 B2 | 7/2011 | Williams | |
| 8,611,817 B2 * | 12/2013 | Kalanithi et al. | 455/41.1 |
| 2010/0240309 A1 | 9/2010 | Barbotin et al. | |
| 2010/0316171 A1 | 12/2010 | Ino | |
| 2012/0269076 A1 * | 10/2012 | Lenaerts | 370/252 |
| 2014/0086301 A1 * | 3/2014 | Akhavan et al. | 375/238 |
| 2014/0086347 A1 * | 3/2014 | Kang | 375/259 |
| 2014/0246924 A1 * | 9/2014 | Proud | 307/114 |

OTHER PUBLICATIONS

Kim, et al., "A Design of Transceiver for 13.56 MHz RFID Reader using the Peak Detector with Automatic Reference Voltage Generator and Voltage Limiter", SoC Design Conference (ISOCC) International, 2010, pp. 287-289.

(Continued)

*Primary Examiner* — Pablo Tran
(74) *Attorney, Agent, or Firm* — Kevin T. Cheatham

(57) ABSTRACT

In a wireless communication system, an initiator, such as a card reader, can communicate with a target, such as a smart card or other device emulating a smart card, by amplitude modulating a radio frequency signal. In a receiver, levels of samples of a digital baseband signal of the amplitude modulated signal can vary. Apparatus and methods associate a received sample with a hard or sliced output state (such as +1, 0, or −1) and update a value associated with the hard output state for accurate slicing of the samples. This permits the use of hard symbols in further processing rather than soft samples, which can dramatically reduce the complexity of circuitry.

35 Claims, 8 Drawing Sheets

(56) References Cited

OTHER PUBLICATIONS

Balachandran, et al., "A Passive UHF RFID Demodulator With RF Overvoltage Protection and Automatic Weighted Threshold Adjustment", EEE Transactions on Circuits and Systems I: Regular Papers, vol. 57, No. 9, Sep. 2010, pp. 2291-2300.

ISO/IEC 18092 Information technology—Telecommunications and information exchange between systems—Near Field Communication—Interface and Protocol (NFCIP-1), First edition Apr. 1, 2004, 66 pages.

ISO/IEC, "Identification cards—Contactless integrated circuit cards—Proximity cards, Part 3: Initialization and anticollision", Second edition Apr. 15, 2011, 70 pgs.

NFC Forum, "NFC Digital Protocol", NFCForum-TS-Digital Protocol-1.0, Nov. 2010, 194 pages.

* cited by examiner

ADAPTIVE SLICER FOR A DISCRETE LEVEL AMPLITUDE MODULATION RECEIVER

CROSS-REFERENCE TO RELATED APPLICATION

This application claims the benefit of U.S. Provisional Application No. 61/702,978, filed Sep. 19, 2012, the entirety of which is hereby incorporated by reference.

FIELD

The invention generally relates to electronics. In particular, the invention relates to wireless near field communication (NFC).

BACKGROUND

The wireless communication environment in a home or an office typically includes a number of independently developed radio access technologies and standards. One of the communication standards currently being implemented in electronic equipment is NFC. The use of NFC interfaces in electronic equipment provides portable devices with functions similar to those of non-contact integrated circuit cards (e.g., RFID cards).

Electronic equipment provided with NFC interfaces are typically capable of operating as radio frequency (RF) readers and/or writers to communicate with other NFC devices. A basic aspect of NFC is an usage of electromagnetic waves in a RF range and that a transmission of information contents is realized over a short distance only, for instance in a range of several centimeters.

RFID applications are widely used in many areas such as public traffic service, object tracking systems and home management. In an NFC or an RFID application, a transmitter of a proximity coupling device (PCD), also known as a reader, writer, or initiator, may use one of following three linear codes, followed by an amplitude modulation: (1) a Modified-Miller code used for type A NFC, (2) a non-return-to-zero (NRZ) code used in type B NFC, and (3) a Manchester code used in type F NFC.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when peer devices communicate in a wireless communication system.

In one innovative implementation, an apparatus receives input samples of a digital baseband signal, associates the input samples with one or more output states, and generates one or more threshold values for slicing of the input samples based on one or more associated samples. By smoothing input samples according to their associated hard or sliced output states (such as +1, 0, or −1), implementations of the invention can advantageously provide adaptive slicing without sensitivity to a DC bias as encountered with simple filtering or averaging of a Miller code, without sensitivity to long runs of the same state as can be encountered with non-return-to-zero (NRZ) signals, or without knowledge or sensitivity to obverse or reverse polarity.

One implementation includes an apparatus, wherein the apparatus includes: a first tracking circuit configured to generate a first tracker output value, wherein the first tracker output value is based on input samples associated with a first output symbol state, wherein the first output state is selected from one of −1, 0, or +1, wherein the input samples comprise samples associated with the first output symbol state and at least a second output symbol state, wherein the second output state is selected from a different one of −1, 0, or +1 from the first output state; a first threshold generator configured to generate a first threshold value based at least partly on the first tracker output value; and a mapper configured to slice input samples to generate sliced output symbols based at least partly on values of the input samples and the first threshold value.

One implementation includes an electronically-implemented method of slicing input samples using adaptively adjusted thresholds, wherein the method includes: generating a first tracker output value, wherein the first tracker output value is based on input samples associated with a first output symbol state, wherein the first sliced output state is selected from −1, 0, or +1, wherein the input samples comprise samples associated with the first output symbol state and at least a second output symbol state, wherein the second output state is selected from a different one of −1, 0, or +1 from the first output state; generating a first threshold value based at least partly on the first tracker output value; and slicing input samples to generate sliced output symbols based at least partly on values of the input samples and the first threshold value.

One implementation includes an apparatus for slicing input samples using adaptively adjusted thresholds, wherein the apparatus includes: a means for generating a first tracker output value, wherein the first tracker output value is based on input samples associated with a first output symbol state, wherein the first sliced output state is selected from −1, 0, or +1, wherein the input samples comprise samples associated with the first output symbol state and at least a second output symbol state, wherein the second output state is selected from a different one of −1, 0, or +1 from the first output state; a means for generating a first threshold value based at least partly on the first tracker output value; and a means for slicing input samples to generate sliced output symbols based at least partly on values of the input samples and the first threshold value.

Details of one or more implementations of the subject matter described in this specification are set forth in the accompanying drawings and the description below. Other features, aspects, and advantages become apparent from the description, the drawings, and the claims.

BRIEF DESCRIPTION OF THE DRAWINGS

These drawings and the associated description herein are provided to illustrate specific implementations of the invention and are not intended to be limiting.

In this description, reference is made to the drawings in which like reference numerals may indicate identical or functionally similar elements.

DETAILED DESCRIPTION OF CERTAIN IMPLEMENTATIONS

Figure 1:
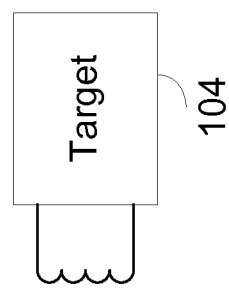
FIG. 1 illustrates an example of an initiator and a target for near field communication (NFC).
Figure 1:
Figure 1:
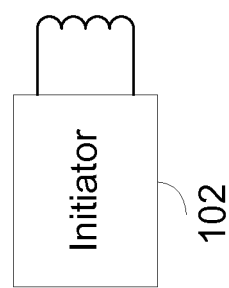

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In one implementation, a card reader (initiator) communicates with an RFID or a smart card (targets). To transmit data, a card reader amplitude-modulates a signal for an RFID or a smart card. After demodulation in the RFID or the smart card, the amplitude modulation is observable as a baseband signal with samples having different levels (see FIG. 5, 6, or 7). Due to environmental conditions, these levels of these samples can vary in a very wide range and are initially processed to a multiple-bit form, such as in 8 bits or in 16 bits, which can express 256 levels or 65,536 levels, respectively. It is desirable to convert or "slice" a sample from multiple-bit form to a more compact form, such as to $\{0, +1\}$, to $\{0, -1\}$, or to $\{-1, 0, +1\}$. For example, samples having a value above a threshold value can be considered to be a 1, and samples having a value below the threshold value can be considered to be a 0. Due to changing environmental conditions, a good value to use for the threshold can change over time. Implementations of the invention associate a sample (multiple-bit) with a sliced state, such as a 1 or a 0, and separately maintain a value representative of the samples of that state. In one implementation, this value can be considered to be a typical value for that state. For example, samples associated with a 1 can be low-pass filtered, averaged together, or the like, to generate a representative value for samples associated with a 1. Similarly, samples associated with a 0 can be low-pass filtered, averaged together, or the like, to generate a representative value for samples associated with a 0. A relatively good threshold value for slicing can then be based on these representative values. For example, the representative value for a 1 and the representative value for a 0 can be averaged together and then used as the threshold value for slicing.

FIG. 1 illustrates an example of an environment for near field communication (NFC). An initiator 102, e.g., a card reader, communicates with a target 104, e.g., a smart card, tag, etc. In one implementation, the target 104 corresponds to a mobile device, such as a smart phone, cell phone, or the like, that emulates a smart card. One advantage of emulation of a smart card is that a mobile device can potentially emulate relatively many different smart cards, which alleviates the need for an end user to carry multiple smart cards. The communication is via magnetic coupling at a relatively low frequency, such as 13.56 Megahertz. For communication from the initiator 102 to the target 104, amplitude modulation can be used. For communication from the target 104 back to the initiator 102, load modulation can be used. The initiator 102 may produce a RF signal in an un-modulated manner. A target 104 near to the initiator 102 sends data by load modulating the RF signal. That load modulation amplitude modulates the previously un-modulated RF signal, and the load modulation is detected by a receiver of the initiator 102.

In some circumstances, initialization can be difficult. For example, one problem that arises is that there is relatively little time between the start of amplitude modulation by the initiator 102 and the start of packets of data being sent by the initiator 102.

Figure 2:
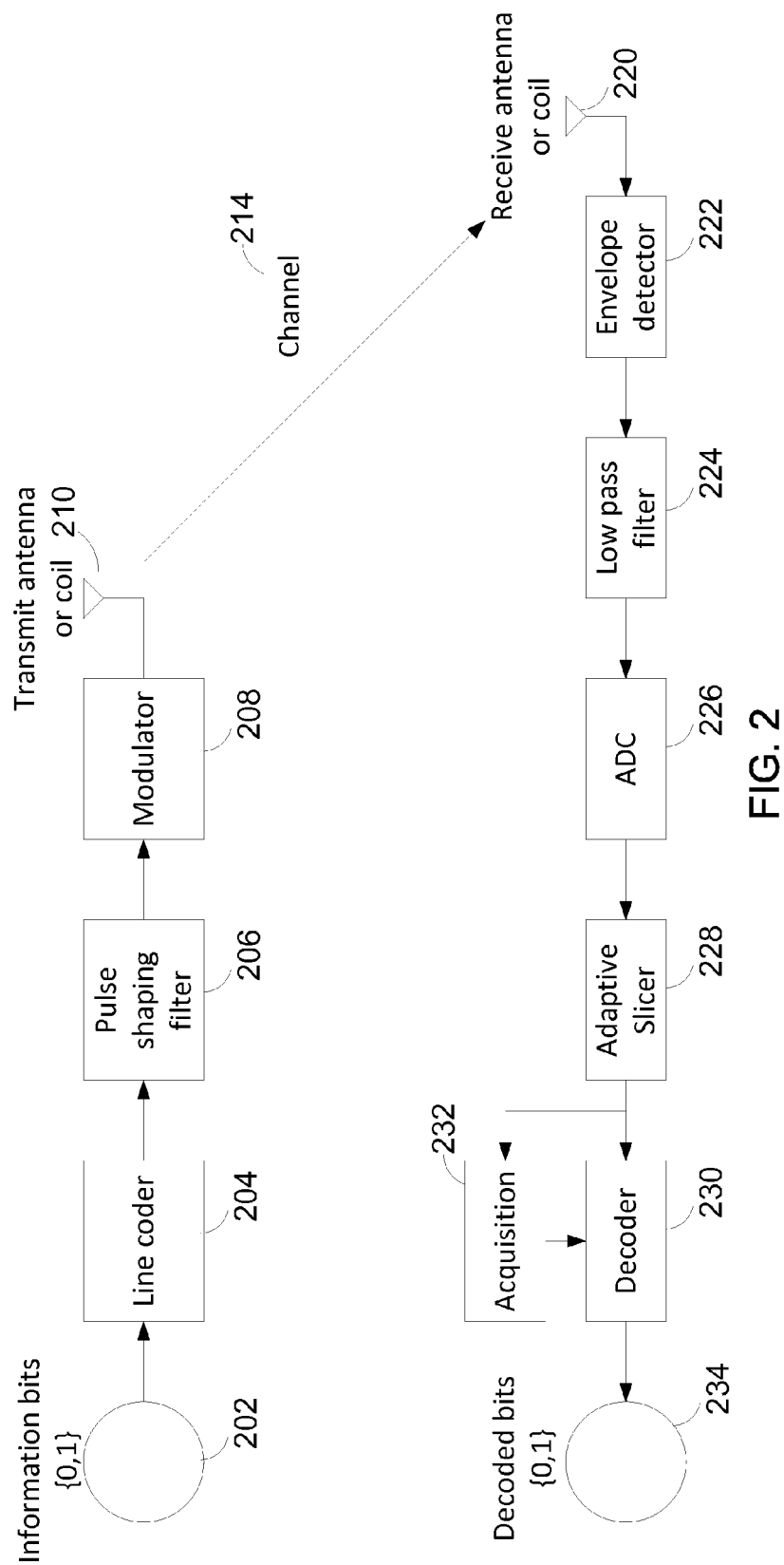
FIG. 2 illustrates a signal processing chain that can be used with NFC.

FIG. 2 illustrates a signal processing chain that can be used with NFC. A signal processing chain for the initiator 102 can include information bits 202, a line coder 204, a pulse shaping filter 206, a modulator 208, and an antenna or coil 210. The modulator 208 provides the amplitude modulation of a signal. In one implementation, the target 104 can correspond to conventional RFIDs or to conventional smart cards, however, targets yet to be developed may also be used. The amplitude modulation of the RF signal is carried over the channel 214 and is received by a receive antenna or coil 220. The channel 214 is typically air, but can include plastics, paper, cloths, leather, etc. through which the signal passes.

The signal processing chain of the target 104 includes the coil 220, an envelope detector 222, a low-pass filter 224, an analog-to-digital converter (ADC) 226, an adaptive slicer 228, a decoder 230, an acquisition block 232, and generates decoded bits 234. The envelope detector 222 demodulates the amplitude modulation of the RF signal to recover a noisy baseband signal, which includes the baseband signal and the ripples at the RF carrier frequency or multiples of the frequency. The low-pass filter 224 removes the ripples leaving the baseband signal. The ADC 226 converts the analog baseband signal to a digital baseband signal. In one implementation, the ADC 226 has 8 bits of resolution, but other bits of resolution can be used and will be readily determined by one of ordinary skill in the art. The output of the ADC 226 comprises multi-bit samples, which may be referred to herein as "soft samples."

The adaptive slicer 228 may be configured to slice the soft samples to hard or sliced symbols, such as, but not limited to, {0, +1}, to {0, −1}, or to {−1, 0, +1}. Slicing refers to the decision made by the adaptive slicer 228 as to which particular hard state, such as which one of 0, −1, or +1, to associate the soft samples. The disclosed techniques are not applicable to mental steps, and are not performed within the human mind or by a human writing on a piece of paper. When further signal processing can be accomplished with binary circuits using the hard or sliced symbols instead of with the soft samples, a dramatic reduction in circuit complexity and cost can be accomplished. For example, the decoder 230 and the acquisition logic 232 can be much simpler and much less expensive circuits to implement if they are configured to operate using hard or sliced symbols. In one implementation, the signals from the ADC 226 and the adaptive slicer 228 comprise oversampled data such that there are extraneous symbols. The acquisition block 232 is configured to "acquire" or synchronize the signal received from the adaptive slicer 228. The decoder 230 is configured to organize the decoded bits 234 for use, such as by removing the extraneous symbols to provide the decoded bits 234 at the proper data rate.

Figure 3:
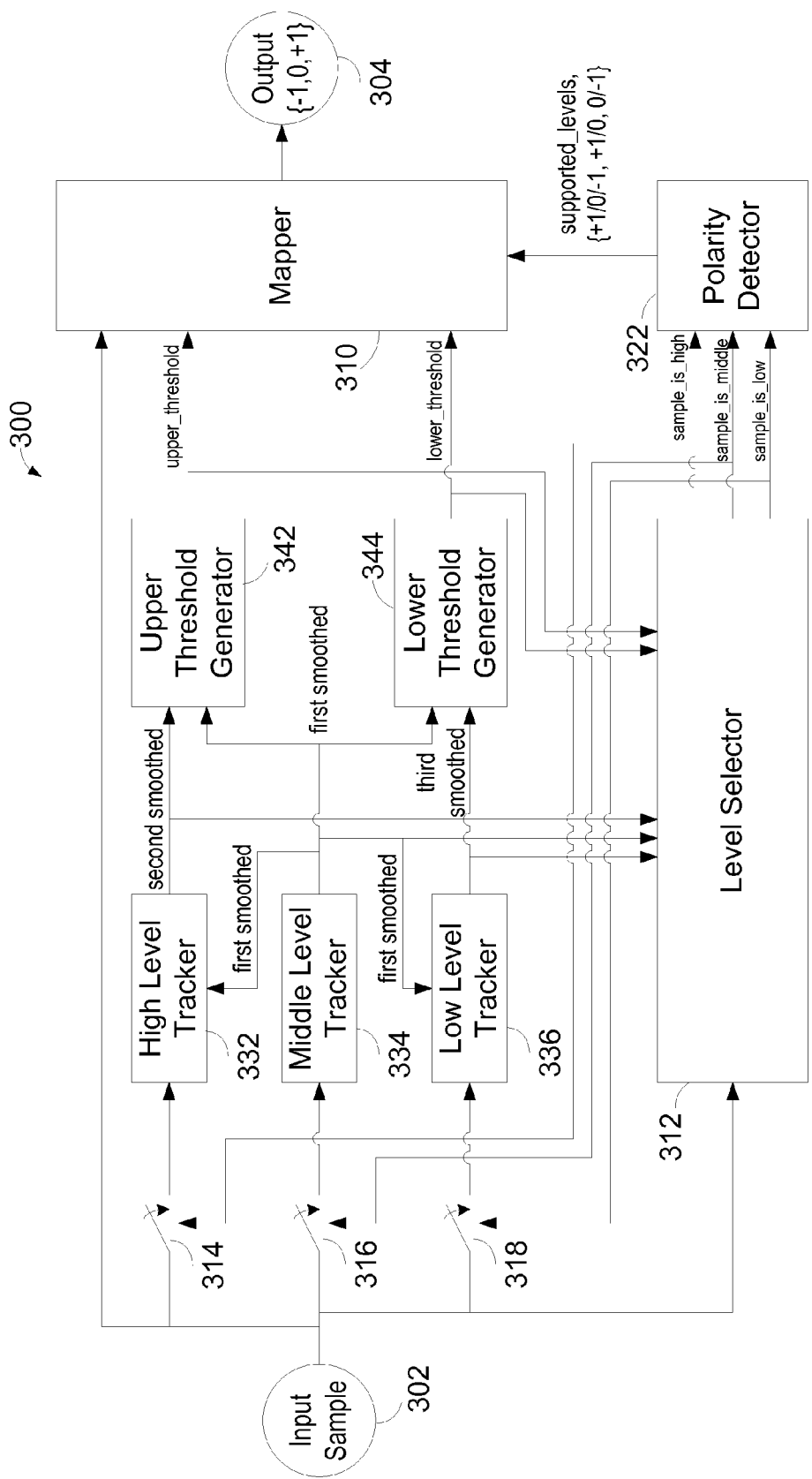
FIG. 3 illustrates one implementation of an adaptive slicer.
Figure 4:
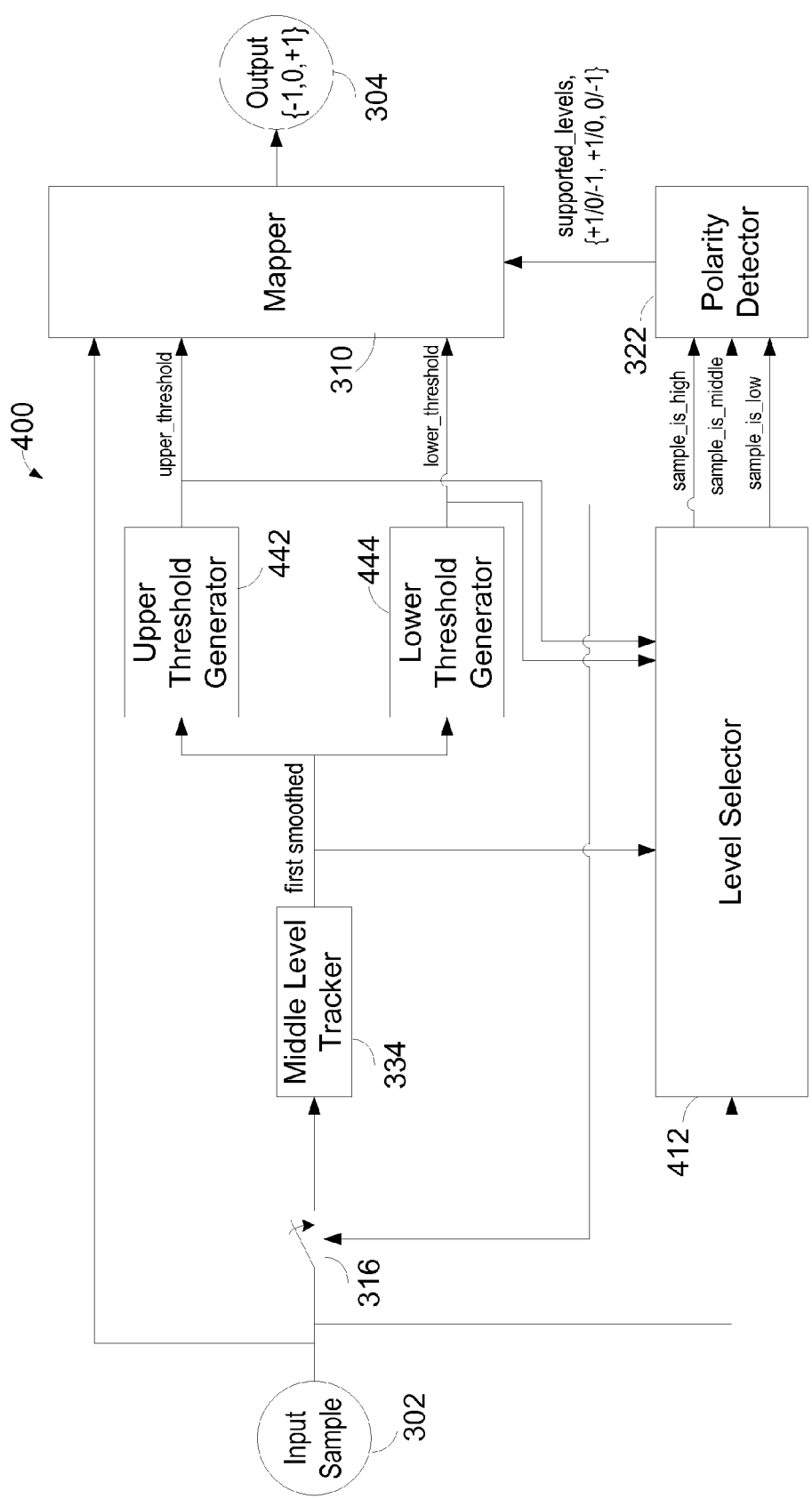
FIG. 4 illustrates an alternative implementation of the adaptive slicer.

FIG. 3 illustrates one implementation of an adaptive slicer 300 which can be used for the adaptive slicer 228 (FIG. 2). FIG. 4, which will be described later, illustrates an alternative implementation of an adaptive slicer. The slicers 300, 400 can be implemented by electronic hardware or by software/firmware or by a combination of both hardware and software/firmware. When implemented by software/firmware, these techniques can be implemented by execution of software modules by a computer hardware system. Instructions for the software can be stored in a tangible, non-transitory computer-readable medium. For example, the tangible non-transient computer-readable medium can include one or more of Random Access Memory (RAM), flash memory, Read Only Memory (ROM), Electrically Programmable ROM (EPROM), Electrically Erasable Programmable ROM (EEPROM), registers, a hard disk, a removable disk, a CD ROM, or any other form of storage medium known in the art.

A soft sample from the digital baseband signal is provided as an input sample 302. The input sample 302 has multiple bits of resolution, such as, but not limited to, 8 bits. The adaptive slicer 300 slices the input sample 302 to generate a hard or sliced symbol as an output sample 304, which is typically binary. For example, the output sample 304 can be {−1, 0} or {0, +1}. However, it is possible for the output sample 304 to be {−1, 0, +1}, which still corresponds to hard or sliced symbols but is not binary.

The adaptive slicer 300 illustrated in FIG. 3 includes a mapper 310, a level selector 312, switches 314, 316, 318, polarity detector 322, a high level tracker 332, a middle level tracker 334, a low level tracker 336, an upper threshold generator 342, and a lower threshold generator 344. In the illustrated implementation, the mapper 310, the level selector 312, and the switches 314, 316, 318 have inputs configured to receive the input sample 302. The switch 314 has a control input coupled to a sample_is_high control signal output of the level selector 312 and an output coupled to an input of the high level tracker 332. The switch 316 has a control input coupled to a sample_is_middle control signal output of the level selector 312 and has an output coupled to an input of the middle level tracker 334. The switch 318 has a control input coupled to a sample_is_low control signal output of the level selector 312 and has an output coupled to an input of the low level tracker 336.

The high level tracker 332 has an input coupled to an output of the switch 314, has an input coupled to an output of the middle level tracker 334 to receive a first smoothed value and has an output coupled to an input of the upper threshold generator 342 for provision of a second smoothed value. The middle level tracker 334 has an input coupled to an output of the switch 316 and has an output coupled to an input of the upper threshold generator 342, to an input of the lower threshold generator 344, to an input of the high level tracker 332, and to an input of the low level tracker 336 for provision of the first smoothed value. The low level tracker 336 has an input coupled to an output of the switch 318, has an input coupled to the output of the middle level tracker 334 to receive the first smoothed value and has an output coupled to an input of the lower threshold generator 344 for provision of a third smoothed value.

The mapper 310 has an input configured to receive the input sample 302, an input coupled to an output of the upper threshold generator 342 to receive an upper_threshold value, and an input coupled to an output of the lower threshold generator 344 to receive a lower_threshold value. An output of the mapper 310 provides the sliced output sample 304.

The level selector 312 has an input configured to receive the input sample 302, has an input coupled to the output of the high level tracker 332, has an input coupled to the output of the middle level tracker 334, has an input coupled to the output of the low level tracker 336, has an input coupled to the output of the upper threshold generator 342, and has an input coupled to the output of the lower threshold generator 344. The level selector 312 further has an output coupled to a control input of the switch 314 and to an input of the polarity detector 322 to provide a sample_is_high control signal, an output coupled to a control input of the switch 316 and to an input of the polarity detector 322 to provide a sample_is_middle control signal, and an output coupled to a control input of the switch 318 and to an input of the polarity detector 322 to provide a sample_is_low control signal. The polarity detector 322 has an input coupled to an output of the level selector 312 to receive the sample_is_high control signal, an input coupled to an output of the level selector 312 to receive the sample_is_middle control signal, and an input coupled to an output of the level selector 312 to receive the sample_is_low control signal. In one implementation, the polarity detector 322 includes counters to count occurrences of the sample_is_high, sample_is_low, and sample_is_middle control signals and bases the detection of polarity on counts within. The polarity detector 322 has an output coupled to an input of the mapper 310 to indicate a polarity or mode {+1, 0, −1}, {+1, 0}, or {0, −1}.

Operation of the adaptive slicer 300 will now be described. Initially, the middle level tracker 334 tracks the middle level (see FIG. 5-7) and settles to a first smoothed value. The first smoothed value is then provided as an input to the high level tracker 332 and to the low level tracker 336 to set initial values for the second smoothed value and the third smoothed value, respectively, which are initially based on the first smoothed value. For example, the initial value for the second smoothed value can be higher than the first smoothed value by an offset value, and the initial value for the third smoothed value can be lower than the first smoothed value by an offset value. The offset value can be predetermined or fixed, can be based on the value, such as a fraction, of first smoothed value, or the like. The high level tracker 332, the middle level tracker 334, and the low level tracker 336 are then individually updated during operation in connection with slicing as described in the following.

The input sample 302 is provided as an input to the mapper 310, to the level selector 312, and to the switches 314, 316, 318. The mapper 310 performs the slicing to generate the output sample 304. For example, for the obverse polarity case (FIG. 5), the mapper 310 slices the input sample 302 using a lower_threshold value. For example, a first digital comparator can be used to perform the slicing by comparing the input sample 302 to the lower_threshold value to generate the output sample 304. For the reverse polarity case (FIG. 6), the mapper 310 slices the input sample 302 using an upper_threshold value. A second digital comparator can compare the input sample 302 to the upper_threshold value to generate the output sample 304. An additional input from the polarity detector 322 can optionally be used to shut off components of the mapper 310 that are not being used to save power. For example, if the initiator 102 is configured to decode {+1, 0, −1} line coding or if the target modulation type is unknown, then slicing with both the lower_threshold and the upper_threshold can remain enabled. However, when it is known that only one of the obverse polarity or the reverse polarity is being used, one or more circuits of the mapper 310 that are not being used can be shut down to save power. For example, an unused digital comparator can be shut down or deactivated.

The level selector 312 generates control signals for the adaptive slicer 300 based on the state of the input sample 302. In one implementation, the level selector 312 uses the same upper_threshold and/or lower_threshold values as the mapper 310 to determine the state of the input sample 302. In one implementation, certain components, such as digital comparators, can be shared between the level selector 312 and the mapper 310 to avoid duplication within the circuit. Based on the associated state of the input sample 302, the level selector 312 activates one of the sample_is_low, sample_is_middle, or sample_is_high control signals when confidence is high in the association for the state, or none when confidence is low. If, for example, the value of an input sample 302 cannot be associated with a 0, +1, or −1 with confidence, then in one implementation, none of the control signals are activated. This prevents the updating of one of the high level tracker 332, the middle level tracker 334, or the low level tracker 336 with an inappropriate value. The confidence determination can be based on, for example, how close the value of the input sample 302 is to the upper_threshold value relative to the first smoothed value and the second smoothed value, or how close the value of the input sample 302 is to the lower_threshold value relative to the first smoothed value and the third smoothed value.

The control signals are used by the optional polarity detector 322 to determine which, if any, of the circuits of the mapper 310 to turn off or deactivate to save power. If, for example, an initiator of a different mode suddenly appears, the level selector 312 and polarity detector 322 can activate the appropriate circuits of the mapper 310.

The control signals also control the switches 314, 316, 318 which provide the input sample 302 to one of the high level tracker 332, the middle level tracker 334, or the low level tracker 336 based on whether the input sample 302 is associated with a high, middle, or low output state, such as +1, 0, or −1. If the input sample 302 is associated with the high output state, such as +1, the level selector 312 and the switch 314 provide the input sample 302 to the high level tracker 332 or enable the same. In one implementation, the switches 314, 316, 318 represent control of the respective tracker 332, 334, 336, such as control via an enable input control. When the enable is activated, a tracker of the trackers 332, 334, 336 accepts the input sample 302 and performs filtering with the input sample 302. When the enable is not active, the tracker ignores the input sample 302. If the input sample 302 is associated with the middle output state, such as 0, the level selector 312 and the switch 316 provide the sample to the middle level tracker 334 or enable the same. If the input sample 302 is associated with low output state, such as −1, the level selector 312 and the switch 316 provide the sample to the low level tracker 336 or enable the same. The high level tracker 332, the middle level tracker 334, and the low level tracker 336 can be a sample-and-hold circuit or low-pass filters, and generate a second smoothed output value, a first smoothed output value, and a third smoothed output value, respectively. The trackers 332, 334, 336 can be implemented by finite impulse response (FIR) filters, infinite impulse response (IIR) filters, by moving average filters, by exponentially-weighted moving average filters or the like.

The second smoothed output value and the first smoothed output value are provided as inputs to the upper threshold generator 342, which generates the upper_threshold value from the second smoothed output and first smoothed output values. In one implementation, the upper threshold generator 342 calculates an average of the second smoothed output value and the first smoothed output value for the upper_threshold value. However, other values can be used, such as values offset from the average.

The third smoothed output value and the first smoothed output value are provided as inputs to the lower threshold generator 344, which generates the lower_threshold value from the third smoothed output and first smoothed output values. In one implementation, the lower threshold generator 344 calculates an average of the third smoothed output value and the first smoothed output value for the lower_threshold value. However, other values can be used, such as values offset from the average.

As discussed earlier, the mapper 310 uses the upper_threshold value and/or the lower threshold value as appropriate to slice the input sample 302. For example, digital comparators can be used to perform the slicing. For example, a first digital comparator can receive the upper_threshold value and the input sample 302 as inputs, and slice the input sample 302 by comparing the value of the input sample 302 to the upper_threshold value. A second digital comparator can receive the lower_threshold value and the input sample 302 as inputs, and slice the input sample 302 by comparing the value of the input sample 302 to the lower_threshold value.

FIG. 4 illustrates an alternative implementation of the adaptive slicer 228. To avoid repetition of description, components having the same or similar function are referenced by the same reference number. A soft sample from the digital baseband signal is provided as the input sample 302. The adaptive slicer 400 includes the mapper 310, a level selector 412, the switch 316, the polarity detector 322, the middle level tracker 334, an upper threshold generator 442, and a lower threshold generator 444.

In the illustrated implementation, the mapper 310, the level selector 312, and the switch 316 have inputs configured to receive the input sample 302. The switch 316 has a control input coupled to a sample_is_middle control signal output of the level selector 412 and has an output coupled to an input of the middle level tracker 334.

The middle level tracker 334 has an input coupled to an output of the switch 316 and has an output coupled to an input of the upper threshold generator 442 and to an input of the lower threshold generator 444 for provision of a first smoothed value.

The mapper 310 has an input configured to receive the input sample 302, an input coupled to an output of the upper threshold generator 442 to receive an upper_threshold value, and an input coupled to an output of the lower threshold generator 444 to receive a lower_threshold value. An output of the mapper 310 provides the sliced output sample 304.

The level selector 412 has an input configured to receive the input sample 302, has an input coupled to the output of the middle level tracker 334, an input coupled to the output of the upper threshold generator 442, and an input coupled to the output of the lower threshold generator 444. The level selector 412 further has an output coupled to an input of the polarity detector 322 to provide a sample_is_high control signal, an output coupled to a control input of the switch 316 and to an input of the polarity detector 322 to provide a sample_is_middle control signal, and an output coupled to an input of the polarity detector 322 to provide a sample_is_low control signal. The polarity detector 322 has an input coupled to an output of the level selector 412 to receive the sample_is_high control signal, an input coupled to an output of the level selector 412 to receive the sample_is_middle control signal, and an input coupled to an output of the level selector 412 to receive the sample_is_low control signal. The polarity detector 322 has an output coupled to an input of the mapper 310 to indicate a polarity or mode {+1, 0, −1}, {+1, 0}, or {0, −1}.

Operation of the adaptive slicer 400 will now be described. The input sample 302 is provided as an input to the mapper 310, to the level selector 412, and to the switch 316. The mapper 310 performs the slicing to generate the output sample 304 as described earlier in connection with FIG. 3. An input from the polarity detector 322 can optionally be used to shut off components of the mapper 310 that are not being used to save power as described earlier in connection with FIG. 3.

The level selector 412 generates control signals for the adaptive slicer 400 based on the state of the input sample 302 as described earlier in connection with FIG. 3. Based on the associated state of the input sample 302, the level selector 412 activates one of the sample_is_low, sample_is_middle, or sample_is_high control signals when confidence is high in the association for the state, or none when confidence is low. If, for example, the value of an input sample 302 cannot be associated with a 0, +1, or −1 with confidence, then in one implementation, none of the control signals are activated. This can prevent the updating of the middle level tracker 334 with an inappropriate value. The confidence determination can be based on, for example, how close the value of the input sample 302 is to the upper_threshold value relative to the first smoothed value, or how close the value of the input sample 302 is to the lower_threshold value relative to the first smoothed value.

The control signals are used by the optional polarity detector 322 to determine which, if any, of the circuits of the mapper 310 to turn off. If, for example, an initiator of a different mode suddenly appears, the level selector 412 and polarity detector 322 can activate the appropriate circuits of the mapper 310. In one implementation without the polarity detector 322, the control signals of sample_is_high and sample_is_low are not generated by the level selector 412, and the sample_is_middle control signal is active or not depending on the value of the input sample 302.

The sample_is_middle control signal controls the switch 316, which provides the input sample 302 to the middle level tracker 334 when the input sample 302 is associated with the middle output state, such as state "0." For example, when the input sample 302 is associated with the middle output state, the level selector 412 and the switch 316 provide the sample to the middle level tracker 334 or enable the middle level tracker 334.

The first smoothed output value is provided as an input to the upper threshold generator 442, which generates the upper_threshold value from the first smoothed output value. In one implementation, the upper threshold generator 442 calculates an offset from the first smoothed output value for the upper_threshold value. The offset can correspond to a predetermined offset amount, such as a predetermined positive offset.

The first smoothed output value is also provided as an input to the lower threshold generator 444, which generates the lower_threshold value from the first smoothed output value. In one implementation, the lower threshold generator 444 calculates an offset from the first smoothed output value for the lower_threshold value. The offset can correspond to a predetermined offset amount, such as a predetermined negative offset.

As discussed earlier, the mapper 310 uses the upper_threshold value and/or the lower threshold value as appropriate to slice the input sample 302. For example, digital comparators can be used to perform the slicing.

Figure 5:
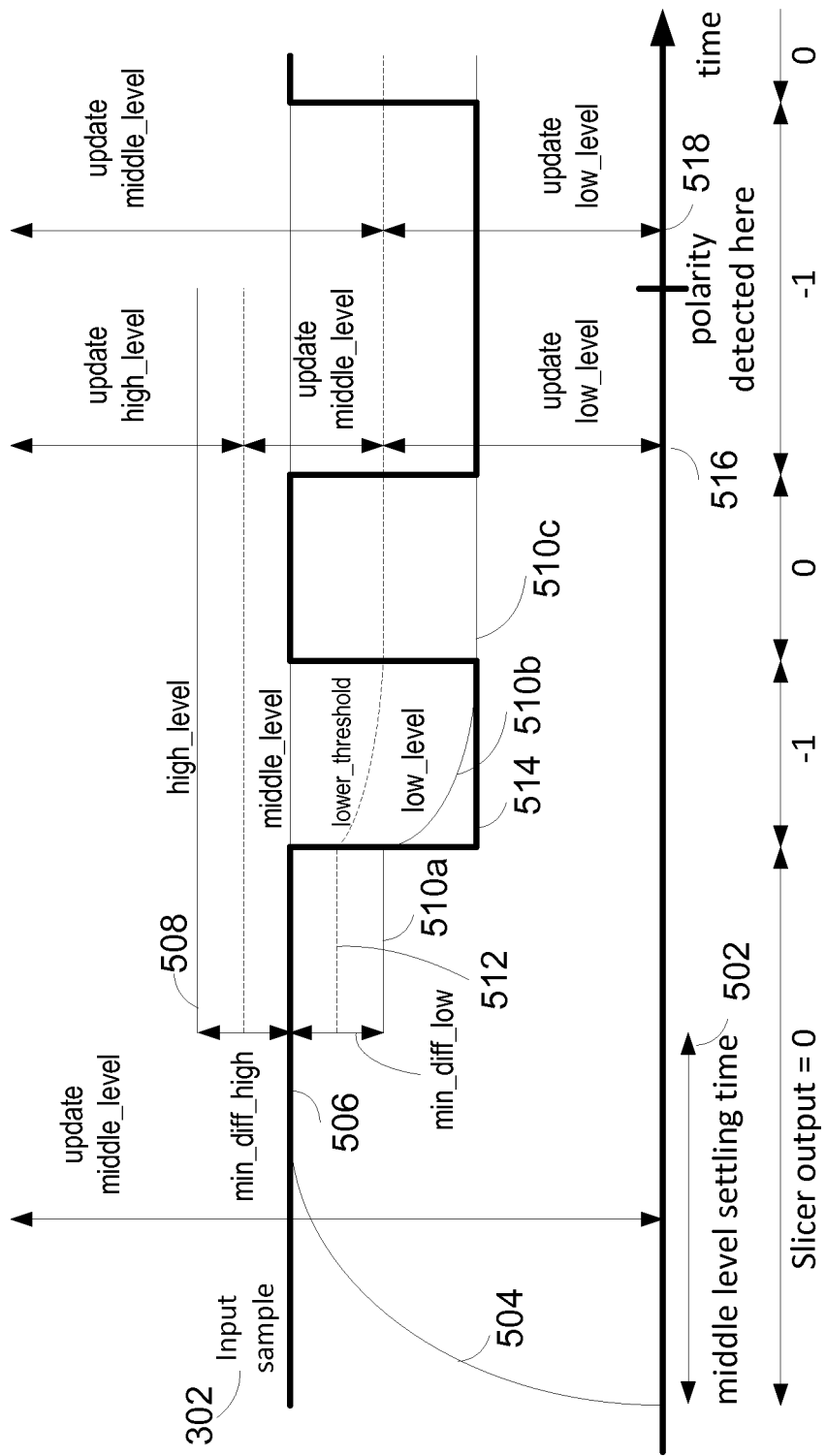
FIG. 5 is a graph illustrating initialization and operating characteristics of one implementation of the adaptive slicer with a binary line coder output symbol and signal is received with obverse polarity.
Figure 6:
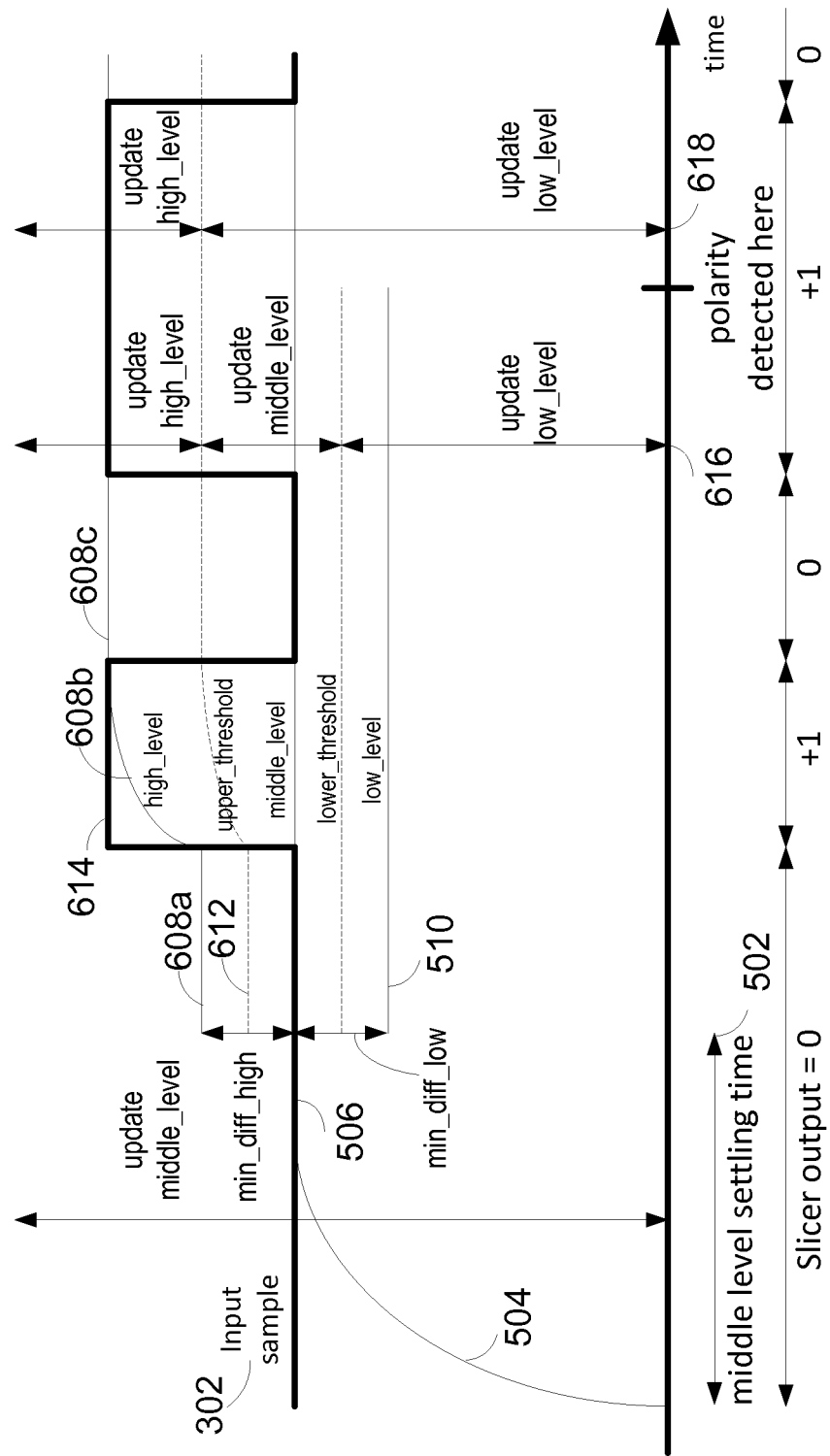
FIG. 6 is a graph illustrating initialization and operating characteristics of one implementation of the adaptive slicer with a binary line coder output symbol and signal is received with reverse polarity.
Figure 7:
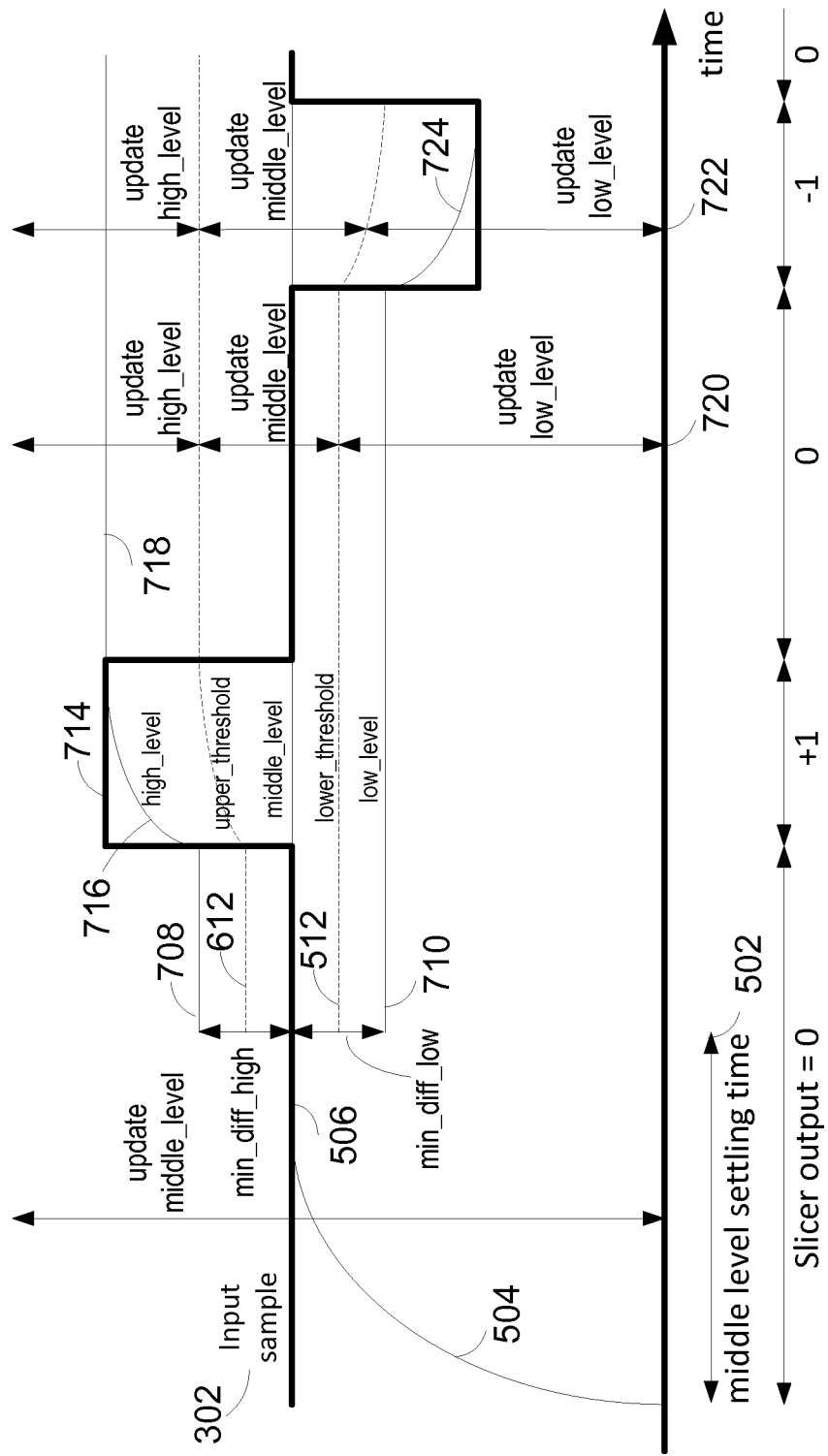
FIG. 7 is a graph illustrating initialization and operating characteristics of one implementation of the adaptive slicer when the line coder output symbol is $\{+1, 0, -1\}$.

FIGS. 5-7 illustrate operating characteristics of some implementations of the adaptive slicer 228. Current standards permit obverse polarity modulation and/or permit reverse polarity modulation. The target 104 is not aware in advance which polarity of modulation will be used by the line coder 204 of the initiator 102, or whether or not the polarity of modulation will be reversed by the transmission channel 214 or by magnetic coupling. Implementations of the invention can determine which polarity of modulation is being used by inspection of the digital baseband signal.

FIG. 5 is a graph illustrating initialization and operating characteristics of one implementation of the adaptive slicer with a binary line coder output symbol and signal is received with obverse polarity. With obverse polarity, the soft input samples 302 vary between a middle level 506 and a low level 510c. For example, the graph can correspond to the initialization and operating characteristics of the adaptive slicer 300 (FIG. 3).

Time is expressed along a horizontal axis, with time increasing to the right. The vertical axis can express a value of an input sample 302 (input to the adaptive slicer 300) with values increasing to the top. The ADC 226 (FIG. 2) can oversample the input samples 302 such that there are relatively many input samples depicted in FIG. 5. During a middle level settling time period 502 for initialization, the middle level tracker 334 tracks the level of input sample 302 as illustrated by the curve 504, and settles to a middle_level 506, which can correspond to the first smoothed level (FIG. 3) and is associated with the state 0. For example, the middle_level 506 can be obtained by low pass filtering the input samples 302. This middle level settling time period 502 can correspond to a period when no amplitude modulation is present.

Continuing with initialization, an offset min_diff_high can be added to the middle_level 506 to generate the initial value for the high_level 508, and an offset min_diff_low can be subtracted from the middle_level 506, to generate the initial value for the low_level 510a. The offsets can be the same value or can be different values. The high_level 508 can correspond to the second smoothed value output of the high level tracker 332, and the low_level 510a can correspond to the third smoothed value output of the low level tracker 336. The lower_threshold 512 can be based on the middle_level 506 and the value of the low_level 510a, such as, but not limited to, a value that is an average of the two. The lower_threshold 512 can be used by the mapper 310 and the level selector 312/412 for slicing.

FIG. 5 further shows an input sample 302 having a low level 514 being received. The value of the input sample 302 with the low level 514 is below the level of the lower_threshold 512 and is associated with the state −1. The value of the low level 514 can be tracked by the low level tracker 336 to adaptively adjust the level of the third smoothed value as illustrated by the curve of the low_level 510*b* to settle at a low_level 510*c*. This has the effect of also adjusting the level of the lower_threshold 512.

FIG. 5 further shows how it is decided whether to update the high_level, the middle_level, or the low_level before a polarity is detected. For example, at the time 516, the input sample 302 is below the lower_threshold 512 and is associated with the −1 state such that the low_level value is updated with the input sample 302.

FIG. 5 further shows how it is decided whether to update the high_level, the middle_level, or the low_level after a polarity is detected. For example, at the time 518, the input sample 302 is again below the lower_threshold 512 and is again associated with the −1 state such that the low_level value is again updated with the input sample 302. By repeatedly associating the input sample 302 with the state 0 or −1 and refreshing the value for the middle_level 506 or the low_level 510*c*, the lower_threshold 512 can be adaptively updated.

FIG. 6 is a graph illustrating operating characteristics of one implementation of the adaptive slicer with a binary line coder output symbol and signal is received with reverse polarity. With reverse polarity, the soft samples vary between a middle level 506 and a high level 608*c* as shown. For example, the graph can correspond to the initialization and operating characteristics of the adaptive slicer 300 (FIG. 3).

Time is expressed along a horizontal axis, with time increasing to the right. The vertical axis can express a value of an input sample 302 (input to the adaptive slicer 300) with values increasing to the top. The ADC 226 (FIG. 2) can oversample the input samples 302 such that there are relatively many input samples depicted in FIG. 6. During the middle level settling time period 502 for initialization, the middle level tracker 334 tracks the level of input sample 302 as illustrated by the curve 504, and settles to a middle_level 506, which can correspond to the first smoothed level (FIG. 3) and is associated with the state 0. For example, the middle_level 506 can be obtained by low pass filtering the input samples 302. This middle level settling time period 502 can correspond to a period when no amplitude modulation is present.

Continuing with initialization, an offset min_diff_high can be added to the middle_level 506 to generate the initial value for the high_level 608*a*, and an offset min_diff_low can be subtracted from the middle_level 506, to generate the initial value for the low_level 510. The offsets can be the same value or can be different values. The high_level 608*a* can correspond to the second smoothed value output of the high level tracker 332, and the low_level 510 can correspond to the third smoothed value output of the low level tracker 336. The upper_threshold 612 can be based on the middle_level 506 and the value of the high_level 508, such as, but not limited to, a value that is an average of the two. The upper_threshold 612 can be used by the mapper 310 and the level selector 312/412 for slicing.

FIG. 6 further shows an input sample 302 having a high level 614 being received. The value of the input sample having the high level 614 is above the level of the upper_threshold 612 and is associated with the state +1. The value of the high level 614 can be tracked by the high level tracker 332 to adaptively adjust the level of the second smoothed value as illustrated by the curve of the high_level 608*b* to settle at a high_level 608*c*. This has the effect of also adjusting the value of the upper threshold 612.

FIG. 6 further shows how it is decided whether to update the high_level, middle_level, or the low_level before a polarity is detected. For example, at time 616, the input sample 302 is above the upper_threshold 612 and is associated with the +1 state such that the high_level value is updated with the input sample 302.

FIG. 6 further shows how it is decided whether to update the high_level, middle_level, or the low_level after a polarity is detected. For example, at time 618, the input sample 302 is again above the upper_threshold 612 and is again associated with the +1 state such that the high_level value is again updated with the input sample 302. By repeatedly associating the input sample 302 with the state 0 or +1 and refreshing the value for the middle_level 506 or the high_level 608*c*, the upper_threshold 612 can be adaptively updated.

FIG. 7 is a graph illustrating operating characteristics of one implementation of the adaptive slicer when the line coder output symbol is {+1, 0, −1}. Currently, such line coding is not specified by standards, but it can be used. Various implementations can monitor the low level, the middle level, and the high level and adaptively select a first slicer threshold based on the middle level and the low level and adaptively select a second slicer threshold based on the middle level and the high level. With {+1, 0, −1} line coding, the soft samples can vary among the middle level, the low level, and the high level as shown. For example, the graph can correspond to the initialization and operating characteristics of the adaptive slicer 300 (FIG. 3).

Time is expressed along a horizontal axis, with time increasing to the right. The vertical axis can express a value of an input sample 302 (input to the adaptive slicer 300) with values increasing to the top. The ADC 226 (FIG. 2) can oversample the input samples 302 such that there are relatively many input samples depicted in FIG. 7. During a middle level settling time period 502 for initialization, the middle level tracker 334 tracks the level of input sample 302 as illustrated by the curve 504, and settles to a middle_level 506, which can correspond to the first smoothed level (FIG. 3) and is associated with the state 0. For example, the middle_level 506 can be obtained by low pass filtering the input samples 302. This middle level settling time period 502 can correspond to a period when no amplitude modulation is present.

Continuing with initialization, an offset min_diff_high can be added to the middle_level 506 to generate the initial value for the high_level 708, and an offset min_diff_low can be subtracted from the middle_level 506, to generate the initial value for the low_level 710. The offsets can be the same value or can be different values. The high_level 708 can correspond to the second smoothed value output of the high level tracker 332, and the low_level 710 can correspond to the third smoothed value output of the low level tracker 336. The lower_threshold 512 can be based on the middle_level 506 and the value of the low_level 710, such as, but not limited to, a value that is an average of the two. The upper_threshold 612 can be based on the middle_level 506 and the value of the high_level 708, such as, but not limited to, a value that is an average of the two. The lower_threshold 512 can be used by the mapper 310 and the level selector 312/412 for slicing.

FIG. 7 further shows an input sample 302 having a high level 714 being received. The value of the input sample 302 with the high level 714 is above the level of the upper_threshold 612 and is associated with the state +1. The value of the high level 714 can be tracked by the high level tracker 332 to adaptively adjust the level of the second smoothed value as illustrated by the curve of the high_level 716 to settle at a high_level 718. This has the effect of also adjusting the upper_ threshold 612.

FIG. 7 further shows how it is decided whether to update the high_level, the middle_level, or the low_level. For example, at the time 720, the input sample 302 is between the lower_threshold 512 and the upper threshold 612 and is associated with the 0 state such that the middle_level value is updated with the input sample 302 at the time 720.

FIG. 7 further shows another example regarding how it is decided whether to update the high_level, the middle_level, or the low_level. For example, at time 722, the input sample 302 is below the lower_threshold 512 and is associated with the −1 state such that the low_level value 710 is updated as shown by the curve 724 with the input sample 302. By repeatedly associating the input sample 302 with the state 0, +1, or −1 and refreshing the value for the middle_level 506, the high level 708, 716, 718, or the low_level 710, 724, respectively, both the upper_threshold 612 and the lower_threshold 512 can be adaptively updated.

Figure 8:
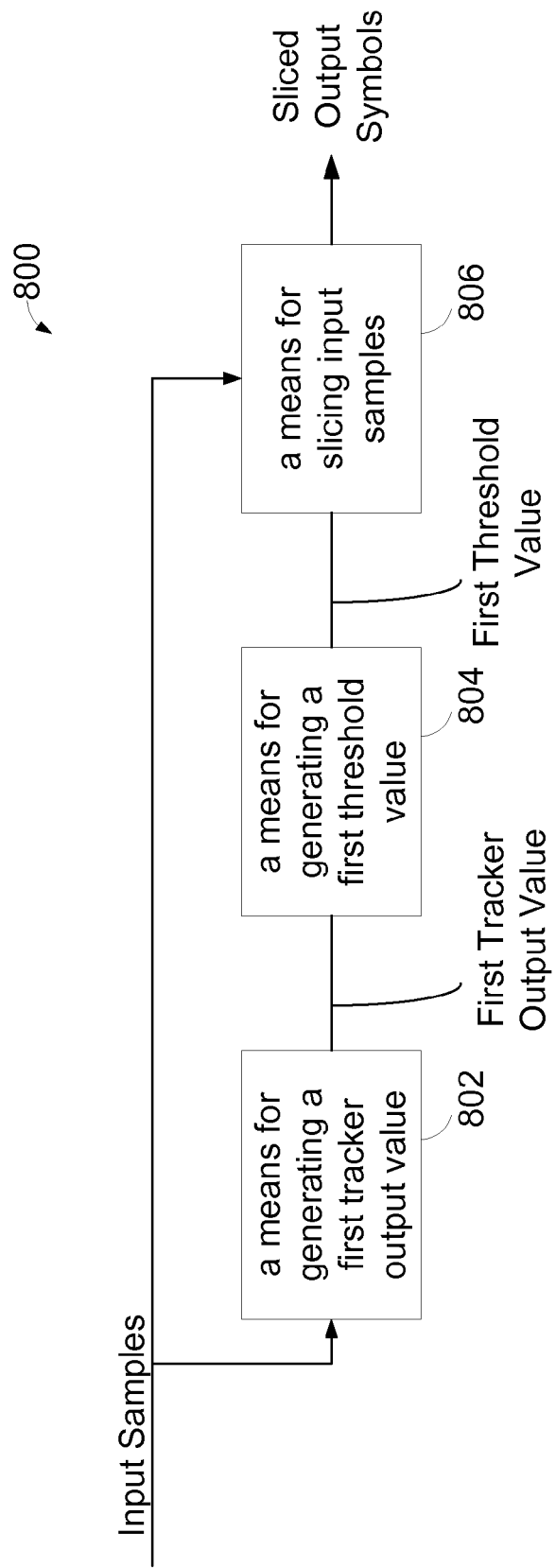
FIG. 8 illustrates another implementation of an adaptive slicer.

FIG. 8 illustrates one implementation of an adaptive slicer 800 which can be used for the adaptive slicer 228 (FIG. 2). The illustrated implementation of the adaptive slicer 800 includes a means for generating a first tracker output value 802 that may indicate the average of a part of the input samples, a means for generating a first threshold value 804, and a means for slicing input samples 806. The means for generating a first tracker output value 802 is connected to the means for generating a first threshold value 804, which is connected to the means for slicing input samples 806.

The means for generating a first tracker output value 802 is configured to generate the first output value based on input samples associated with a first output symbol state, wherein the first sliced output state is selected from −1, 0, or +1, wherein the input samples comprise samples associated with the first output symbol state and at least a second output symbol state, wherein the second output state is selected from a different one of −1, 0, or +1 from the first output state. The means for generating a first threshold value 804 is configured to generate the first threshold value based at least partly on the first output value. The means for slicing input samples 806 is configured to generate sliced output symbols based at least partly on values of the input samples and the first threshold value.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus, comprising:
a first tracking circuit configured to generate a first tracker output value, the first tracker output value based on input samples associated with a first output symbol state, the first output symbol state has a first value, the input samples comprise samples associated with the first output symbol state and at least a second output symbol state, the second output symbol state having a second value different from the first value;
a first threshold generator configured to generate a first threshold value based at least partly on the first tracker output value; and
a mapper configured to slice input samples to generate sliced output symbols based at least partly on values of the input samples and the first threshold value.

2. The apparatus of claim 1, further comprising a second threshold generator configured to generate a second threshold value based at least partly on the first tracker output value, wherein the mapper is configured to slice input samples to generate sliced output symbols based at least partly on values of the input samples, the first threshold value, and the second threshold value.

3. The apparatus of claim 2, further comprising:
a second tracking circuit configured to generate a second tracker output value based on input samples associated with a second output symbol state; and
a third tracking circuit configured to generate a third tracker output value based on input samples associated with a third output symbol state having a third value, wherein the first value corresponds to one of $-1, 0,$ or $+1$, wherein the second value corresponds to a different one of $-1, 0,$ or $+1$, wherein the third value is selected from a different one of $-1, 0,$ or $+1$ from the first value and the second value;
wherein the first threshold generator is configured to generate the first threshold value based on the first tracker output value and the second tracker output value; and
wherein the second threshold generator is configured to generate the second threshold value based on the first tracker output value and the third tracker output value.

4. The apparatus of claim 3, wherein:
the first threshold generator is configured to generate the first threshold value based on an average of the first tracker output value and the second tracker output value; and
the second threshold generator is configured to generate the second threshold value based on an average of the first tracker output value and the third tracker output value.

5. The apparatus of claim 3, wherein:
the first tracking circuit is configured to initialize the first tracker output value based at least partly on input samples received during an unmodulated period;
the second tracking circuit is configured to initialize the second tracker output value based at least partly on the first tracker output value and a first offset value; and
the third tracking circuit is configured to initialize the third tracker output value based at least partly on the first tracker output value and a second offset value.

6. The apparatus of claim 1, further comprising a level selector configured to associate an input sample of the input samples with one of at least the first output symbol state or the second output symbol state, and to selectively activate the first tracking circuit when the input sample is associated with the first output symbol state.

7. The apparatus of claim 1, wherein the input samples comprise samples of a digital baseband signal downconverted from an amplitude modulated near field communication signal, wherein the mapper comprises a plurality of digital comparators, the apparatus further comprising a polarity detector configured to determine whether the digital baseband signal is modulated with obverse polarity modulation or reverse polarity modulation, and to deactivate a digital comparator of the plurality of digital comparators based on the determination.

8. The apparatus of claim 7, wherein the polarity detector is further configured to determine whether the digital baseband signal is modulated with obverse polarity modulation or reverse polarity modulation by monitoring counts of occurrences of the first output symbol state, the second output symbol state, and a third output symbol state, wherein the third output state is selected from a different one of −1, 0, or +1 from the first output state and the second output state.

9. The apparatus of claim 1, wherein:
the first threshold generator is configured to generate the first threshold value based on the first tracker output value and a first offset; and
the second threshold generator is configured to generate the second threshold value based on the first tracker output value and a second offset.

10. The apparatus of claim 9, wherein the first offset and the second offset are the same.

11. The apparatus of claim 1, wherein the mapper further comprises a digital comparator, wherein the first threshold value and the input samples are provided as inputs to the digital comparator.

12. The apparatus of claim 1, wherein the first tracking circuit comprises a low-pass filter.

13. The apparatus of claim 1, wherein the first tracker output value is based only on input samples associated with the first output symbol state.

14. An electronically-implemented method of slicing input samples using adaptively adjusted thresholds, the method comprising:
generating a first tracker output value, the first tracker output value based on input samples associated with a first output symbol state, the first sliced output symbol state has a first value, the input samples comprise samples associated with the first output symbol state and at least a second output symbol state, the second output state having a second value different from the first value;
generating a first threshold value based at least partly on the first tracker output value; and
slicing input samples to generate sliced output symbols based at least partly on values of the input samples and the first threshold value.

15. The method of claim 14, further comprising generating a second threshold value based at least partly on the first tracker output value, wherein slicing input samples further comprising slicing based at least partly on values of the input samples, the first threshold value, and the second threshold value.

16. The method of claim 15, further comprising:
generating a second tracker output value based on input samples associated with a second output symbol state; and
generating a third tracker output value based on input samples associated with a third output symbol state having a third value, wherein the first value corresponds to one of −1, 0, or +1, wherein the second value corresponds to a different one of −1, 0, or +1, wherein the third value is selected from a different one of −1, 0, or +1 from the first value and the second value;
wherein generating the first threshold value further comprises generating the first threshold value based on the first tracker output value and the second tracker output value; and
wherein generating the second threshold value further comprises generating the second threshold value based on the first tracker output value and the third tracker output value.

17. The method of claim 16, wherein:
generating the first threshold value further comprises generating the first threshold value based on an average of the first tracker output value and the second tracker output value; and generating the second threshold value further comprises generating the second threshold value based on an average of the first tracker output value and the third tracker output value.

18. The method of claim 16, wherein:
initializing the first tracker output value based at least partly on input samples received during an unmodulated period;
initializing the second tracker output value based at least partly on the first tracker output value and a first offset value; and
initializing the third tracker output value based at least partly on the first tracker output value and a second offset value.

19. The method of claim 14, wherein generating a first tracker output value is performed by a first tracking circuit, the method further comprising:
associating an input sample of the input samples with one of at least the first output symbol state or the second output symbol state; and
selectively activating the first tracking circuit when the input sample is associated with the first output symbol state.

20. The method of claim 14, wherein the input samples comprise samples of a digital baseband signal downconverted from an amplitude modulated near field communication signal, wherein slicing is performed by a mapper comprising a plurality of digital comparators, the method further comprising determining whether the digital baseband signal is modulated with obverse polarity modulation or reverse polarity modulation, and deactivating a digital comparator of the plurality of digital comparators based on the determination.

21. The method of claim 20, further comprising determining whether the digital baseband signal is modulated with obverse polarity modulation or reverse polarity modulation by monitoring counts of occurrences of the first output symbol state, the second output symbol state, and a third output symbol state, wherein the third output state is selected from a different one of −1, 0, or +1 from the first output state and the second output state.

22. The method of claim 14:
wherein generating the first threshold value further comprising generating the first threshold value based on the first tracker output value and a first offset; and
wherein generating the second threshold value further comprising generating the second threshold value based on the first tracker output value and a second offset.

23. The method of claim 22, wherein the first offset and the second offset are the same.

24. The method of claim 14, wherein slicing is performed by a digital comparator, wherein the first threshold value and the input samples are provided as inputs to the digital comparator.

25. The method of claim 14, wherein generating a first tracker output value further comprises low-pass filtering.

26. The method of claim 14, wherein the first tracker output value is based only on input samples associated with the first output symbol state.

27. An apparatus for slicing input samples using adaptively adjusted thresholds, the apparatus comprising:
a means for generating a first tracker output value, the first tracker output value based on input samples associated with a first output symbol state, the first sliced output symbol state has a first value, the input samples comprise samples associated with the first output symbol state and at least a second output symbol state, the second output state having a second value different from the first value;

a means for generating a first threshold value based at least partly on the first tracker output value; and a means for slicing input samples to generate sliced output symbols based at least partly on values of the input samples and the first threshold value.

28. The apparatus of claim 27, further comprising means for generating a second threshold value based at least partly on the first tracker output value, the slicing means is further configured to slice based at least partly on values of the input samples, the first threshold value, and the second threshold value.

29. The apparatus of claim 28, further comprising:

a means for generating a second tracker output value based on input samples associated with a second output symbol state; and a means for generating a third tracker output value based on input samples associated with a third output symbol state having a third value, wherein the first value corresponds to one of −1, 0, or +1, wherein the second value corresponds to a different one of −1, 0, or +1, wherein the third value is selected from a different one of −1, 0, or +1 from the first value and the second value;

wherein the generating the first threshold value means is further configured to generate the first threshold value based on the first tracker output value and the second tracker output value; and wherein the generating the second threshold value means is further configured to generate the second threshold value based on the first tracker output value and the third tracker output value.

30. The apparatus of claim 29, wherein:

the generating the first threshold value means is further configured to generate the first threshold value based on an average of the first tracker output value and the second tracker output value; and the generating the second threshold value means is further configured to generate the second threshold value based on an average of the first tracker output value and the third tracker output value.

31. The apparatus of claim 27, wherein the first tracker output value generating means is further configured to base the first tracker output value only on input samples associated with the first output symbol state.

32. An apparatus comprising:

a processor; and a computer program executable by the processor, the computer program embodied in a tangible, non-transitory computer readable medium, wherein the computer program embodies a method of slicing input samples using adaptively adjusted thresholds, the method comprising:

generating a first tracker output value, the first tracker output value based on input samples associated with a first output symbol state, the first sliced output symbol state has a first value, the input samples comprise samples associated with the first output symbol state and at least a second output symbol state, the second output state having a second value different from the first value;

generating a first threshold value based at least partly on the first tracker output value; and slicing input samples to generate sliced output symbols based at least partly on values of the input samples and the first threshold value.

33. The apparatus of claim 1, wherein the first value corresponds to one of −1, 0, or +1, wherein the second value corresponds to a different one of −1, 0, or +1.

34. The method of claim 14, wherein the first value corresponds to one of −1, 0, or +1, wherein the second value corresponds to a different one of −1, 0, or +1.

35. The apparatus of claim 27, wherein the first value corresponds to one of −1, 0, or +1, wherein the second value corresponds to a different one of −1, 0, or +1.

* * * * *